April 20, 1926.

J. McGREGOR ET AL

HEAT EXCHANGER

Filed July 30, 1921    2 Sheets-Sheet 1

1,581,651

INVENTORS
John McGregor
Frank C. Seehusen
BY
ATTORNEY

April 20, 1926. 1,581,651
J. McGREGOR ET AL
HEAT EXCHANGER
Filed July 30, 1921 2 Sheets-Sheet 2
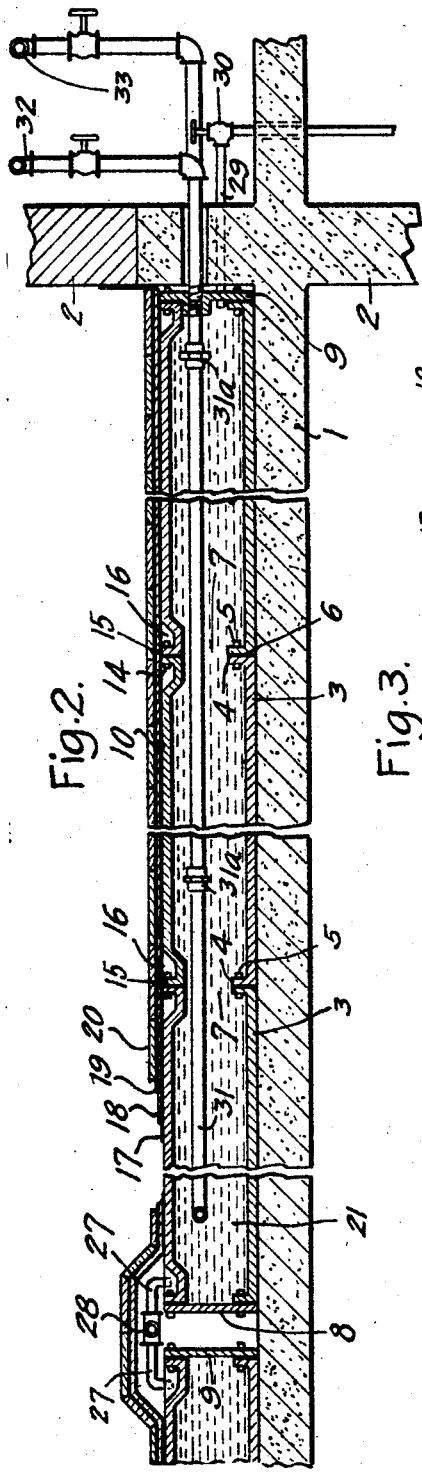
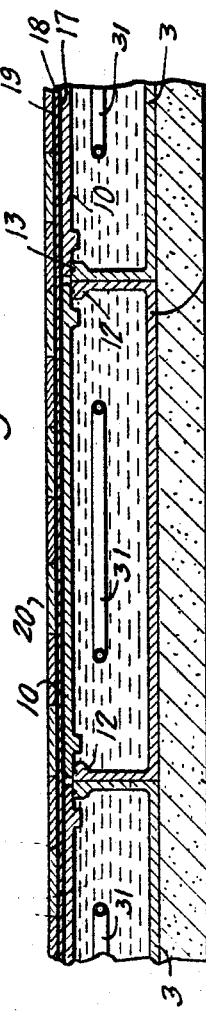
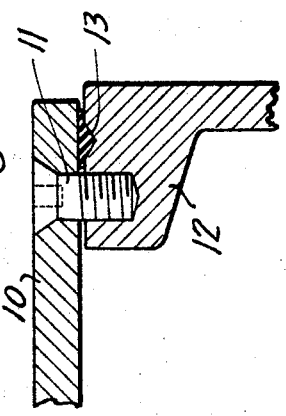
INVENTORS
John McGregor
Frank C. Seehusen
BY
ATTORNEY Patented Apr. 20, 1926.

1,581,651

UNITED STATES PATENT OFFICE.

JOHN McGREGOR AND FRANK C. SEEHUSEN, OF NEW YORK, N. Y., ASSIGNORS TO THE FOUNDATION COMPANY, A CORPORATION OF NEW YORK.

HEAT EXCHANGER.

Application filed July 30, 1921. Serial No. 488,527.

*To all whom it may concern:*

Be it known that we, JOHN McGREGOR and FRANK C. SEEHUSEN, citizens of the United States, and residents of New York city, New York, have invented certain new and useful Improvements in Heat Exchangers, of which the following is a specification.

This invention relates to improved apparatus for either heating or cooling large areas such as the floors of bleach chambers, glass works, steel works or other similar plants where it is desirable to control the temperature of large areas for the convenience of workmen or to produce a beneficial effect on the products being handled in such manufacturing plants.

The objects and advantages of the invention will be apparent from the following description and the novel features pointed out in the appended claims.

In the drawings, Fig. 1 is a plan view of a floor construction with parts broken away in the interest of clearness;

Fig. 2 is a section on line 2—2 of Fig. 1 on an enlarged scale;

Fig. 3 is a transverse section on line 3—3 of Fig. 1;

Fig. 4 is an enlarged detail section.

Figure 1:
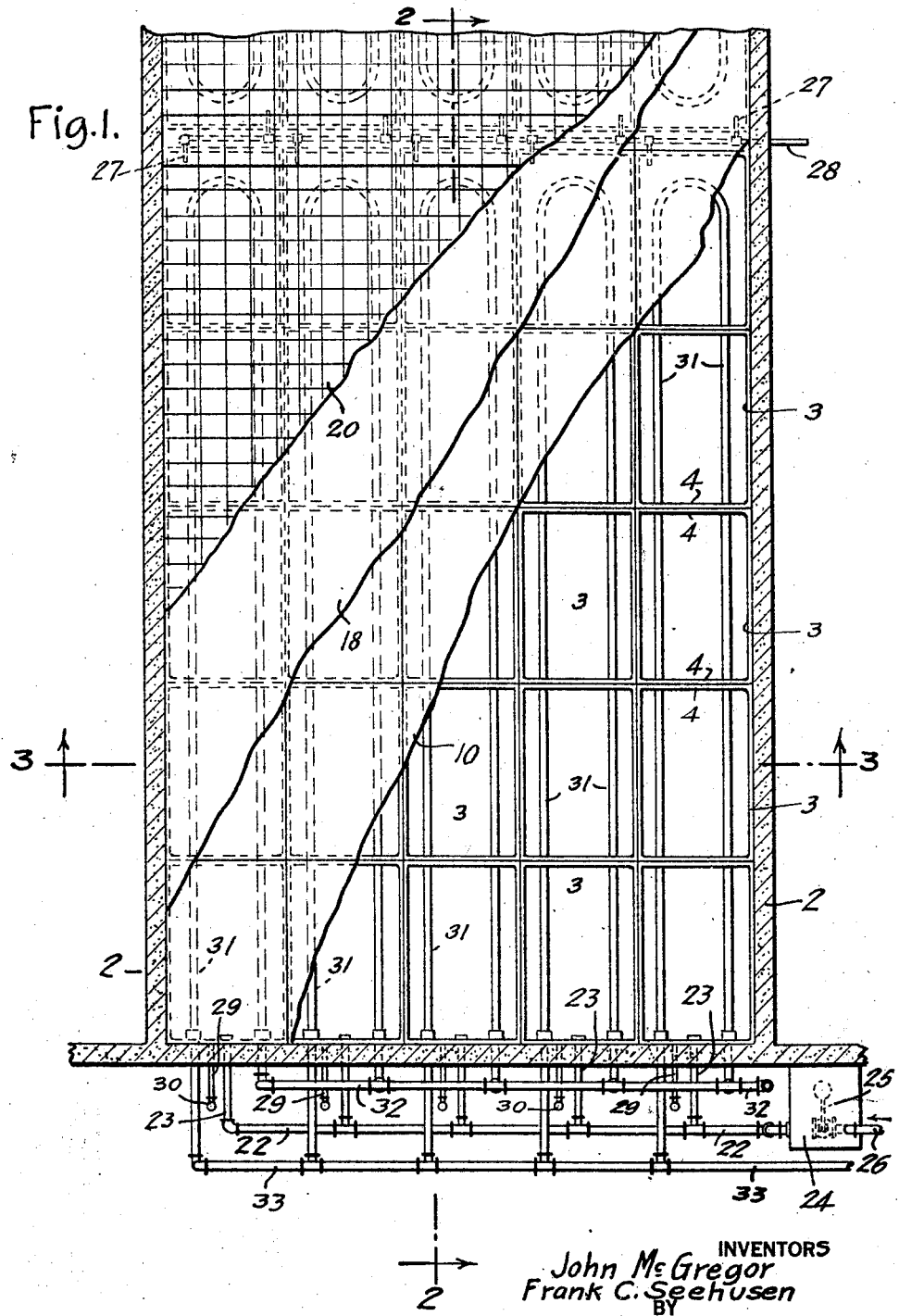

In the drawings 1 represents a typical form of floor which may be constructed of concrete or other suitable material, and 2 walls or partitions of a building. Above the floor 1 we secure a multiplicity of tanks arranged in rows alongside of one another. Each row comprises a plurality of tanks 3 having end flanges 4 which abut and are secured to one another by bolts 5, gaskets 6 being interposed between the flanges to form a liquid tight joint. The adjacent tanks are provided with openings at the ends as indicated at 7 so as to permit communication with one another. And at the extreme ends of each row the tanks are closed by plates 8 and 9. Cover plates 10 are detachably secured by means of counter-sunk screws 11 to flanges 12 formed on the side walls of the tanks, a gasket 13 being interposed between the flange 12 and the cover 10, Fig. 4. The adjacent cover plates are also secured to one another by means of bolts 14 passing through flanges 15 formed on the cover plates. These plates are formed with depressions 16 so that the bolts may be conveniently located below the top surface of the covers as shown in Fig. 2. The tanks as thus constructed present a smooth floor surface free from all projections, and may be covered by suitable wear-resisting materials. In the drawings we have shown a layer of asphaltum or other protective paint 17 coating the top of the tanks over which are laid sheets of galvanized iron 18 having a coating 19 of asphalt or tar on which is finally laid a course of flat tile 20.

The tanks are adapted to contain a heat absorption medium 21. This medium is preferably a fluid introduced through an inlet main 22 having branches 23 communicating with each row of tanks. This main 22 is connected to a reservoir 24 having a float valve 25 therein adapted to control the flow of fluid through the supply pipe 26 so as to automatically keep the tanks 3 filled. Each row of tanks is connected by means of branch pipes 27 with a main 28 adapted to vent the tanks. These tanks are also provided with drain pipes 29 having suitable control valves 30 connected thereto.

The medium 21 with which the tanks are filled is not adapted to circulate but is merely used as a heat exchanging medium. This fluid may be either water, brine, calcium chloride solution, oil or other suitable fluids adapted to either heat or cool the exposed surface of the floor 20.

This fluid is either heated or cooled by means of circulating pipes 31 immersed in the absorption medium 21. The circulating pipes 31 in each row of tanks being formed in separate sections connected to one another by suitable unions 31$^a$ and connected respectively with an inlet main 32 and an outlet main 33. These mains are adapted to be connected with a source for supplying either a hot or cold fluid to either heat or cool the absorption medium 21. By this construction it will be appreciated that the several coils 31 may be used as ammonia expansion coils and connected with suitable refrigerating machinery where extremely low temperatures are required.

From the above it will be seen that our invention provides a hollow liquid-tight floor which can be assembled in units so as to adapt it for the floors of different areas. It will also be apparent that if necessary or desirable the different sections may be exposed for repair by removing the protective coverings and detaching the covers 10.

Though we have described with great particularity of detail the apparatus shown, it is not to be inferred that we are limited thereto as changes in construction and arrangement and substitution of equivalents may be made without departing from the invention as defined in the appended claims.

What we claim is:

1. A floor construction including a series of tanks each comprising a plurality of units arranged in rows joined to and communicating with one another and containing a non-circulating heat absorption solution and pipes immersed in said solution and adapted to circulate a fluid to control the temperature of the absorption solution and means for draining each row.

2. A floor construction including a series of tanks arranged in separate rows alongside one another, the tanks in each row being separate metallic units communicating with and detachably secured to one another and containing a non-circulating heat absorption medium, circulating pipes immersed in the absorption medium in each row of tanks, means for supplying a temperature controlling fluid to said circulating pipes, air vents and drains for each row of tanks and wear-resisting material for covering the top of said tanks adapted to form a substantially smooth floor surface.

3. A floor construction including a series of chambers arranged in rows joined to and communicating with one another and containing a non-circulating heat absorption solution and pipes immersed in said solution and adapted to circulate a fluid to control the temperature of the absorption solution, and means for draining each row, means for venting the air from each row of chambers and a wear resisting covering for the top of said chambers adapted to form a substantially smooth floor surface.

In witness whereof, we have hereunto signed our names.

JOHN McGREGOR.
FRANK C. SEEHUSEN.